(12) United States Patent
Harris (10) Patent No.: US 7,273,214 B2
(45) Date of Patent: Sep. 25, 2007

(54) CHUCK

(75) Inventor: David Harris, Frosterley (GB)

(73) Assignee: Black & Decker Inc., Newark, DE (US)

( * ) Notice: Subject to any disclaimer, the term of this patent is extended or adjusted under 35 U.S.C. 154(b) by 330 days.

(21) Appl. No.: 10/806,784

(22) Filed: Mar. 23, 2004

(65) Prior Publication Data

US 2005/0121861 A1 Jun. 9, 2005

(30) Foreign Application Priority Data

Dec. 4, 2003 (GB) ................................ 0328107.8

(51) Int. Cl.
*B23B 31/10* (2006.01)
*B23B 31/16* (2006.01)
(52) U.S. Cl. ........................................ 279/62; 279/902
(58) Field of Classification Search .................. 279/62, 279/902, 60, 61, 140
See application file for complete search history.

(56) References Cited

U.S. PATENT DOCUMENTS

| 5,145,194 | A | * | 9/1992 | Huff et al. ..................... 279/62 |
| 5,411,275 | A | * | 5/1995 | Huff et al. ..................... 279/62 |
| 5,503,409 | A | | 4/1996 | Rohm |
| 5,531,461 | A | * | 7/1996 | Huff et al. ..................... 279/62 |
| 5,788,248 | A | * | 8/1998 | Gibson ......................... 279/51 |
| 5,934,689 | A | * | 8/1999 | Montjoy ...................... 279/62 |
| 6,010,135 | A | * | 1/2000 | Miles et al. .................. 279/62 |
| 6,053,507 | A | * | 4/2000 | Yang ........................... 279/62 |
| 6,217,033 | B1 | * | 4/2001 | Sakamaki et al. ............ 279/62 |
| 6,390,481 | B1 | * | 5/2002 | Nakamuro .................... 279/62 |
| 6,398,226 | B1 | | 6/2002 | Huggins et al. |
| 6,474,657 | B1 | * | 11/2002 | Fan-Chiang et al. .......... 279/62 |
| 6,550,785 | B2 | * | 4/2003 | Rohm ......................... 279/62 |
| 6,575,478 | B2 | * | 6/2003 | Rohm et al. .................. 279/62 |
| 6,889,986 | B2 | * | 5/2005 | Rohm ......................... 279/62 |
| 6,902,172 | B2 | * | 6/2005 | Rohm ......................... 279/62 |
| 2002/0109307 | A1 | * | 8/2002 | Rohm et al. .................. 279/62 |
| 2002/0149159 | A1 | * | 10/2002 | Fan-Chiang et al. .......... 279/62 |
| 2003/0111804 | A1 | * | 6/2003 | Huggins et al. ............... 279/62 |
| 2003/0141675 | A1 | * | 7/2003 | Zhou ........................... 279/62 |
| 2005/0023775 | A1 | * | 2/2005 | Yang et al. .................... 279/62 |
| 2005/0212223 | A1 | * | 9/2005 | Tian et al. .................... 279/62 |
| 2007/0013150 | A1 | * | 1/2007 | Yang et al. .................... 279/62 |

FOREIGN PATENT DOCUMENTS

| DE | 3 434 112 A1 | 3/1986 |
| GB | 2113125 A * | 8/1983 |
| GB | 2 362 119 A | 11/2001 |

* cited by examiner

*Primary Examiner*—Monica Carter
*Assistant Examiner*—Michael W. Talbot
(74) *Attorney, Agent, or Firm*—Harness, Dickey & Pierce, P.L.C.

(57) ABSTRACT

A chuck to this disclosed which has a central body for including a nose section 6 and a tail section 8. A central portend is formed through the chuck to and a plurality of passageways 12 are angled thereto. Jaws 14 may move through the passageways 12 in response to rotation of a rotatable nut 20 which is in screw thread engagement with the jaws 14. A bearing member 36 is disclosed which sits in a tapered portion between the body for and the nut 20 so that radial displacement of the bearing 36 causes the chuck to be locked against release.

28 Claims, 11 Drawing Sheets

CHUCK

The present invention relates to chucks. The invention has particular, although not exclusive, relevance to such chucks as are used on powered drills or screwdrivers, or the like.

BACKGROUND OF THE INVENTION

Whatever the nature of the mechanism by which the chuck is rotated, there is always a need for the workpiece (such as a drill or screwdriver bit) presented to the chuck to be held in a non-rotatable relationship thereto. One of the most frustrating factors in using a rotating workpiece held by chuck is the working loose of the grip of the chuck on the workpiece. Not only does this result in frictional wear between the gripping member of the chuck and the workpiece (which can result in extremely high temperatures and even cause melting of plastics componentry) but can often result in the workpiece becoming jammed in the item into which it is being drilled or screwed.

Both of the above problems have been addressed in the art, but with varying degrees of success. For example, in EP-A-0710520 there is disclosed a chuck for use with a powered drill or screw driver having locking members utilised to be moved between an engaged and a released position by rotation of the outer sleeve relative to a locking ring. In addition an engagement mechanism is disclosed having two engagement positions and is fitted between the sleeve and the ring. In one position the locking element is engaged, and in the other position it is released. There is also disclosed an intermediate ring having side parts and a collar to prevent any turning.

Whilst, in theory, the above mechanism functions to allow locking of the chuck once the jaws thereof are sufficiently tightened around a workpiece, in practice the componentry is highly complex and, therefore, both difficult and expensive to assemble. Furthermore, should any of the componentry malfunction, then easy and quick repair to the chuck is highly difficult.

An alternative method by which the chuck jaws may be locked tight to a workpiece in advance of use of the chuck is disclosed in EP-A-0519412. The chuck disclosed therein a plurality of angularly displaced detents are formed in either or both of the rotatable nut or the body assembly. The aim is for the balls of the bearing race to "drop" into the detents as the chuck jaws are tightened around a workpiece. In this way, apparently, the propensity for the chuck to become loosened during use is obviated.

Although the chuck disclosed in EP-A-0519412 is far more simple than that of EP-A-0710520, it still suffers significant shortcomings. For example, the choice of material for the nut or the body assembly (within which the displaced detents are formed) is critical. If the material chosen is too soft, then the balls can simply gouge out their own annular channel over a period of time during each tightening process, thereby removing the ability of the chuck to "lock". Alternatively, if the material chosen is too hard, then it becomes brittle and can crack under the torque applied during the tightening process.

It is an object of the present invention, therefore, to at least alleviate the above-mentioned shortcomings by providing a more simple and effective means of locking the jaws of the chuck in the position in which they are securely fastened around a workpiece, as compared to the prior art. The need for an excessively complex arrangement and, therefore, the need for a large number of components to achieve this is avoided. Equally, the problems associated of the choice of hardness of the chuck materials becomes less relevant than in the prior art above.

BRIEF SUMMARY OF THE INVENTION

According to the present invention, therefore, there is provided a chuck characterised in that between the nut and the central body a part-conical surface is formed, along which part-conical surface the at least one bearing member may travel as the nut is rotated relative to the central body, and along which part-conical surface the at least one bearing member may be displaced radially with respect to the axis of rotation of the central body under action of at least a predetermined amount of force acting upon the at least one bearing member such that the displacement of the bearing member results in frictional engagement between the bearing member and a portion of the chuck which is non-rotatable relative to the central body, thereby to restrain the nut from rotation in the opposite sense under action of less than the predetermined force. The use of a part-conical surface along which the at least one bearing member may both rotate and be displaced radially, permits locking of the chuck by utilisation only of the bearing member itself once the jaws of the chuck are advanced tight around a workpiece. By not needing a large number of components in order to lock the chuck when the jaws are in their "tight" position, therefore, the complexity of the chuck design is kept to a minimum and this reduces the manufacturing and assembly costs of the chuck. Furthermore there is no problem with choice of hardness of the material used for the locking mechanism.

Advantageously the part-conical surface is formed by a surface of the nut which contacts the at least one bearing member and which surface of the nut is arranged to be not perpendicular to the axis of rotation of the central body. Alternatively the part-conical surface is formed by a surface of the central body which contacts the at least one bearing member and which surface of the central body is arranged to be not perpendicular to the axis of rotation of the central body. By having the sides of either (or both) of the nut and/or the central body arranged to be non-parallel, then a taper is created along which the bearing surface may move under action of at least a predetermined force.

Preferably the radial displacement of the bearing member is outwards from the central axis of rotation of the central body.

In a preferred embodiment the central body has formed thereon a thrust plate, against which thrust plate the at least one bearing member is able to rotate under influence of rotation of the nut. This provides the advantage of the material of the central body itself not having to be of any specific hardness in relation to the bearing member. Properties of materials relevant to the movement of the bearing member can, therefore, be accommodated solely by the thrust plate itself.

Preferably the surface of thrust plate against which the at least one bearing member rotates is not perpendicular to the axis of rotation of the central body. In this manner, therefore, the thrust plate itself can provide the part-conical surface.

Advantageously the at least one bearing member comprises a resiliently deformable ring. Alternatively the at least one bearing member comprises a plurality of radially moveable or expandable elements. Still alternatively yet the at least one bearing member comprises a plurality of bearing elements pivotable about a pivot point.

In another alternative, means are provided by which the bearing member may be displaced radially with respect to the axis of rotation of the central body. Depending upon the environment in which the chuck is to be used, any one of, or even combination of, the above, may be utilised.

In a preferred embodiment of the present invention a solid line of rotation about the surface of the central body, or the thrust plate, or the surface of the nut which contacts the at least one bearing member forms a cone or a frusto-conical surface.

Preferably the nut and the central body between them form the part-conical surface. Or the thrust plate and the central body between them form the part-conical surface.

Preferably the bearing member includes a plurality of rolling members to reduce frictional contact between the bearing member and either of the nut or the central body.

Advantageously the plurality of rolling members comprise bearing balls. Alternatively the plurality of rolling members comprise cylindrical needle bearings.

BRIEF DESCRIPTION OF THE DRAWINGS

By way of example only, an embodiment of the present invention will be described herebelow with reference to the accompanying drawings of which.

DETAILED DESCRIPTION OF THE INVENTION

Figure 1:
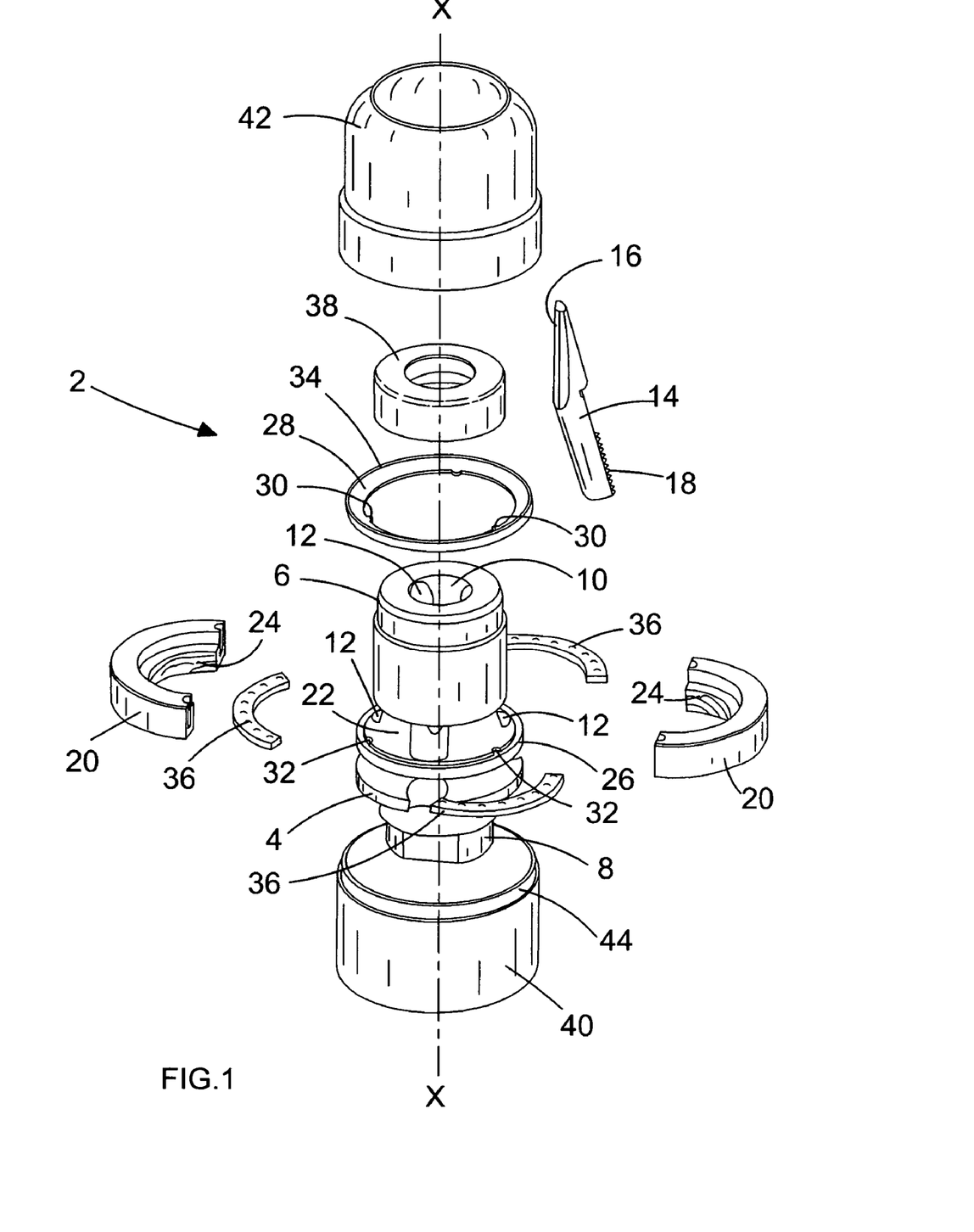
FIG. 1 shows an exploded perspective view of a chuck in accordance with a first embodiment of the present invention.

Referring firstly to FIG. 1 it can be seen that the entire chuck assembly shown generally as 2 comprises a central body 4 having a nose section 6 and a tail section 8. A central axial bore 10 passes right the way through the central body 4. The central axial bore 10 defines an axis of rotation, X-X, of the chuck 2. The portion of the axial bore 10 formed within the tail section 8 has an internally threaded portion (not shown) for mating with a corresponding external thread on an output spindle of a drill or screw driver, or the like, (again, not shown). Alternative embodiments are possible which do not use the threaded portions, but utilise tapers or location fits to allow for quick release of the entire chuck from the spindle upon which it is mounted.

Formed within the nose section 6 of the central body 10 are a plurality (in this example there are three, equally spaced around the central axial bore 10 at 120° intervals thereabout) passageways 12 inclined at an angle relative to the axis X-X. Within each of these passageways 12 is formed a jaw 14 defining a front of face 16 and having formed, on a side opposite to the front face 16 thereof, a threaded portion 18.

Each of the jaws 14 is able to slidably move within its respective pasageway 12 in order to be advanced or retracted. The jaws can advance, or converge forward, of the nose section 6 so that the front face 16 of the jaws grasp a workpiece presented thereto. Retraction of the jaws causes a radial separation of the front faces 16 so as to release the workpiece.

A rotatable nut 20 (formed in two halves) is formed around a central annular recess portion 22 of the central body 4. The rotatable nut 20 has an internal screw thread 24 formed thereon so as to mate with the threaded portions 18 of each of the jaws 14. In known manner, therefore, rotation of the nut 20 in one sense will cause advancement of the jaws 14 within their respective passageways 12, whilst rotation of the nut 20 in the opposite sense will cause retraction of the jaws 14 within their respective passageways 12.

The annular recess portion 22 of the central body 4, includes a lower lip member 26. Mounted on the lower lip 26 is a thrust plate 28. The thrust plate 28 is held relative to the central body 4 by virtue of a plurality (in this example three, spaced at 120° around the central axis X-X) radially-inwardly projecting bosses 30 which mate with corresponding radially-inwardly projecting recesses 32 mounted on the central body 4.

The thrust plate 28, although generally annular, is L-shaped in cross-section. That is, it has an axially extending circumferential lip 34, the purpose of which will be explained in greater detail hereafter.

Mounted on the thrust plate 28 is a bearing member, in this example, a plurality (here three) of bearing member elements 36, the purpose of which will be explained below.

The entire chuck assembly 2 is held together by frictional engagement in the known manner of a push-fit assembly. A metallic nose piece 38 is force-fitted over the nose section 6 of the central body 4. A plastics rear sleeve member 40 is force-fitted over the tail section 8 of the central body 4. Finally, a front plastics sleeve member 42 is force-fitted over the composite nut 20 and overlies an annular recess portion 44 of the rear sleeve 40. Those skilled in the art will appreciate that there is no necessity for a plastics sleeve member to be utilised. Metal or metallic sleeve members, for example, achieve the same function, but utilise a different material. This is simply viewed as a matter of design choice to the skilled addressee.

The method of assembly of the chuck 2 as described above will not be described in any further detail herein. It is well known from the art and, if further reference is necessary to the method of assembly, reference is hereby made, by way of example, to EP-A-0867249.

Figure 2A:
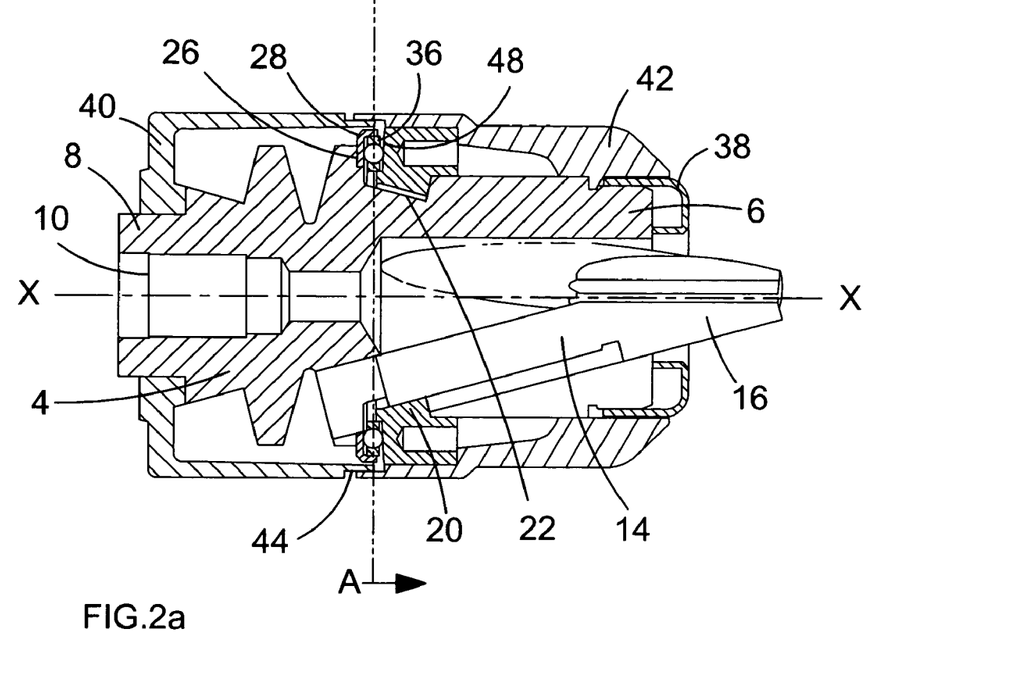
FIG. 2(a) shows a longitudinal section of the chuck FIG. 1 taken along the central axis of rotation X-X.
Figure 2B:
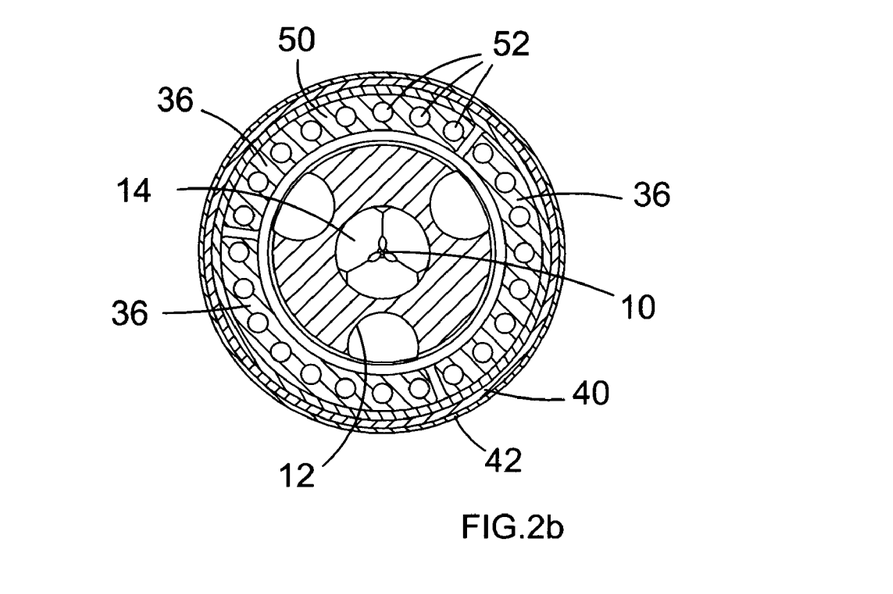
FIG. 2(b) shows a section taken along the line A-A of FIG. 2(a)

Referring now to FIGS. 2(a) and 2(b), it can be seen how the structure illustrated in FIG. 1 fits together. More particularly, it can be seen that, working from the central axis X-X outwards, the central body 4 accepts the rotatable nut 20 via the annular recess portion 22. The front plastics sleeve 42 sits around the nut 20 thereby holding it in place around the recess portion 22. In the example shown in FIG. 2(a) the thrust plate 28 is shown to be resting upon the lower lip 26 so that the bearing member 36 is sandwiched between the thrust plate 28 and a running surface 48 of the nut 20. The running surface 48 is actually that part of the nut 20 which is in contact with the bearing member 36.

Thus, as a user rotates the front plastics sleeve 42 relative to the rear plastics sleeve 40, the nut 20 is rotated relative to the central body 4. This comes about because, in known manner, the rear plastics sleeve 40 is non-rotatably coupled (via frictional push-fit engagement) to the tail section 8 of the central body 4. Whereas the front plastics sleeve member 42 is in non-rotatable engagement (again, via push-fit frictional engagement) with the rotatable nut 20, but is, therefore, in rotatable engagement (or, in the preferred embodiment shown, does not actually touch) with the nose section 6 or metallic nose ring 38.

In the position shown in FIGS. 2(*a*) and 2(*b*) the jaws 14 are in their advanced position. This means that the front faces 16 thereof are either gripping a workpiece or (as in the figures) are now fully advanced position wherein each of the front faces 16 touches its other two jaw 14 neighbours.

Looking in more detail and FIG. 2(*b*) it can be seen that the bearing member 36 comprises three arcuate portions at 120° intervals around the central bore 10 (or the central axis X-X). In the example shown in FIG. 2(*b*) the bearing members 36 each comprise a flexible plastics arcuate part-ring portion 50. Formed within the structure of the flexible plastics portion 50 are a plurality of bearings, in this example chrome steel balls 52. The balls protrude above and below the surface of the plastics ring portion 50 (and when viewed in the direction along the axis X-X) so as to provide two surfaces, each surface of which the thrust plate 28 and the nut 20 rotate upon. This can be seen most readily from FIG. 2(*a*), but is a technique well-known in the art.

In the example shown, however, the angle between the surface of the thrust plate 28 upon which each of the balls 52 rotates and that of the running surface 48 of the nut 20 which contacts the balls 52 on the other side from the thrust plate 28 is such as to create a part-conical, or tapered, surface. In other words the part-conical surface formed by the running surface 48 of the nut 20, or a part-conical surface formed by the angle of the surface of the thrust plate 28 which contacts the balls 52 (in either case) is arranged to be not perpendicular to the axis X-X of rotation of the central body 4. This will be made clear with respect to FIGS. 3, 4 and 5.

Figure 3:
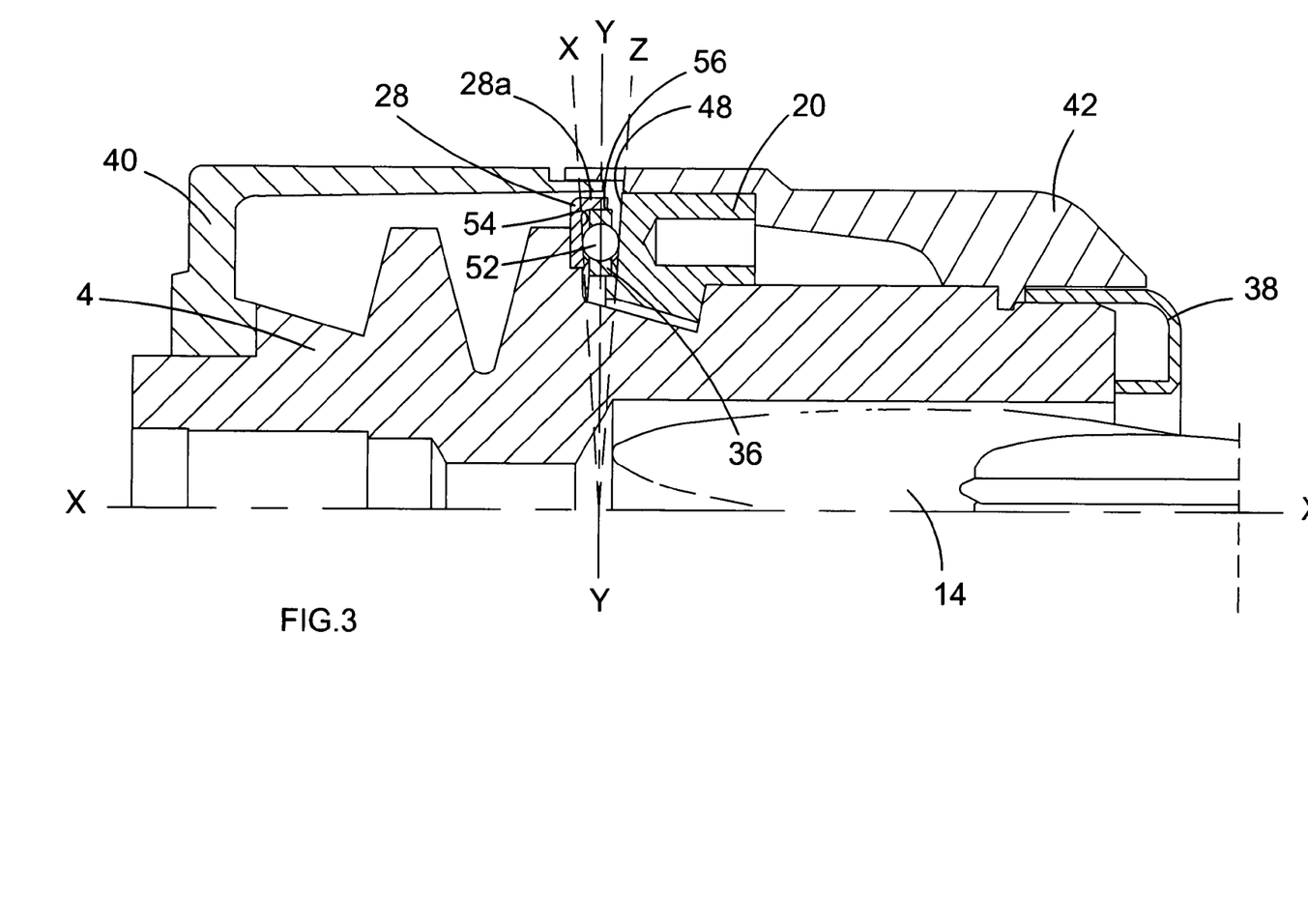
FIGS. 3 to 5 inclusive show detailed sectional views of portions of different embodiments of chuck design.

Referring now to FIG. 3 there is shown in more detail the relationship between the running surfaces against which the balls 52 rotate. A surface Y-Y is shown which is perpendicular to the central axis X-X. It is along this surface Y-Y that the bearing member 36 sits. It can be seen from FIG. 3 that two other surfaces are shown, X-Y and the Z-Y. The angle between these surfaces, in this example, is chosen to be 3°. However, it has been found that an angle within the range 0-15° is acceptable, preferably in the range of 1-10°, and more preferably 2-5°. In any event, the purpose of having such an angle between the planes X-Y and Z-Y is to provide a part-conical surface, or taper, along which the bearing member 36 may be moved.

More specifically, the running surface (that is the surface against which the balls 52 of the bearing member 36 rotate) of the thrust plate 28, here the face 54, is arranged to lie along the plane X-Y. The running surface 48 of the nut 20, on the other hand, is arranged to lie along the surface X-Z.

As the front plastics sleeve 42 is rotated relative to the rear plastics sleeve 40, and the jaws 14 either advance to grip workpiece, or, alternatively, are advanced to their foremost position as shown in FIG. 2(*a*), then there will be a "tightening" or clamping force felt by the balls 52 of the bearing member 36 as the rotational force applied to the nut 20 is taken up as a result of no further advancement of the jaws 14 within their respective passageways 12. Because of the part-conical surface formed between the running surface 48 of the nut 20 and the running surface 54 of the thrust plate 28, then the balls 52 (and, hence, the entire bearing member 36) will be forced radially outward (under continued torque force applied as between the front sleeve 42 and the rear sleeve 40) as shown in FIG. 3 along the taper formed between the two planes X-Y and Z-Y. This radial displacement of the bearing member 36 and the balls 52 results in a frictional engagement at 56, this being the point of contact between the radially external circumference of the bearing member 36 and the inner circumferential longitudinally extending flanged portion 28a of the thrust plate 28. This frictional engagement at the contact position 56 is, of course, governed by the torque applied as a force differential between the front plastics sleeve 42 and the rear plastics sleeve 40 via the user. Clearly there must be a predetermined amount of force applied to the bearing member 36 in order to force it to move radially outwards and thus frictionally contact the flanged portion 28a. Equally, therefore, this frictional engagement prevents rotation of the nut 20 in the opposite sense (thereby to retract the jaws 14 within their respective passageways 12) unless and until the user applies a second predetermined force in that opposite sense to the nut 20 via the rotational difference between the front sleeve member 42 and rear sleeve member 40.

Thus, by use of a part-conical surface defining a taper formed between the planes X-Y and Z-Y it is possible to lock the entire chuck mechanism against self-loosening once it has been sufficiently tightened by the user.

Figure 4:
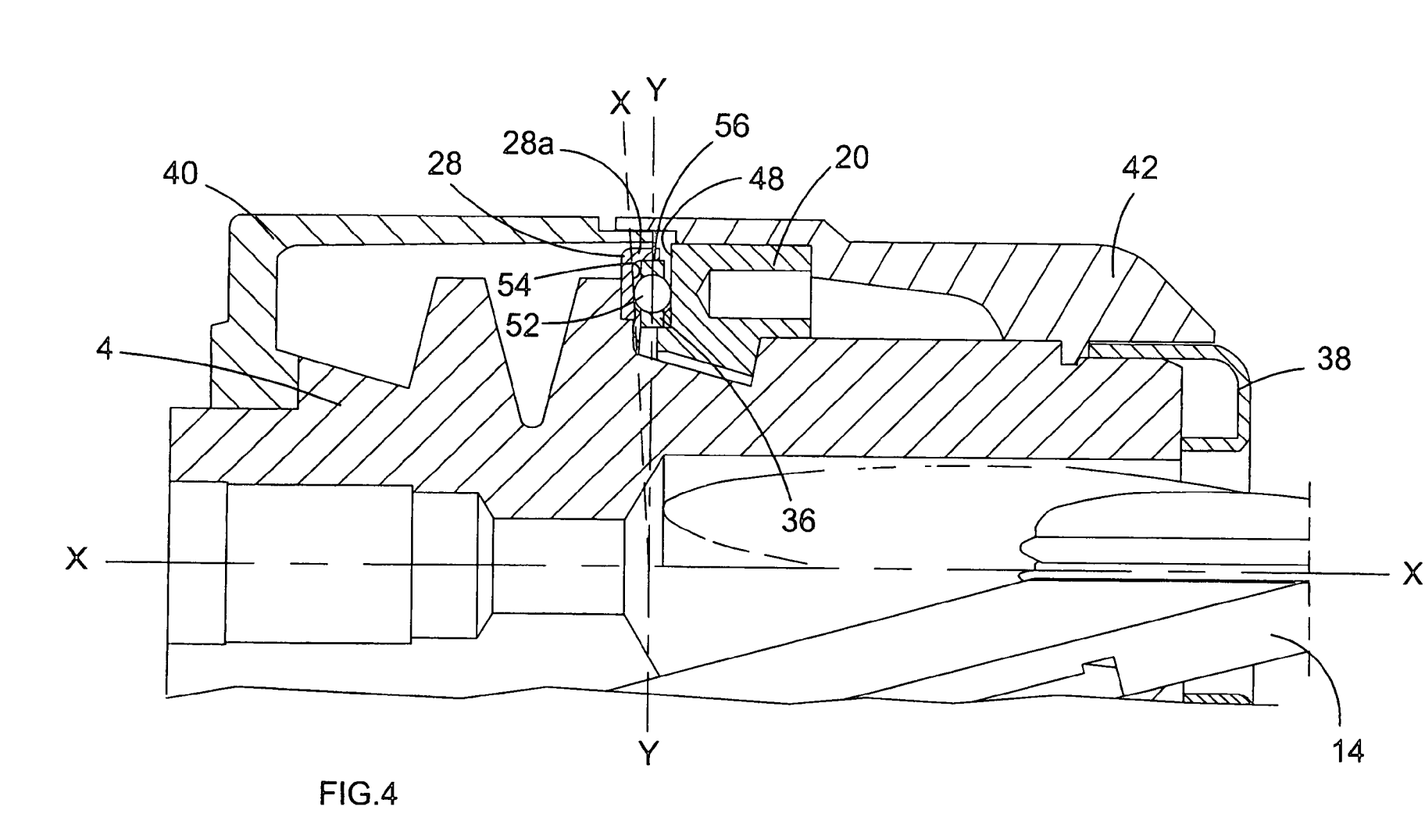
Figure 5:
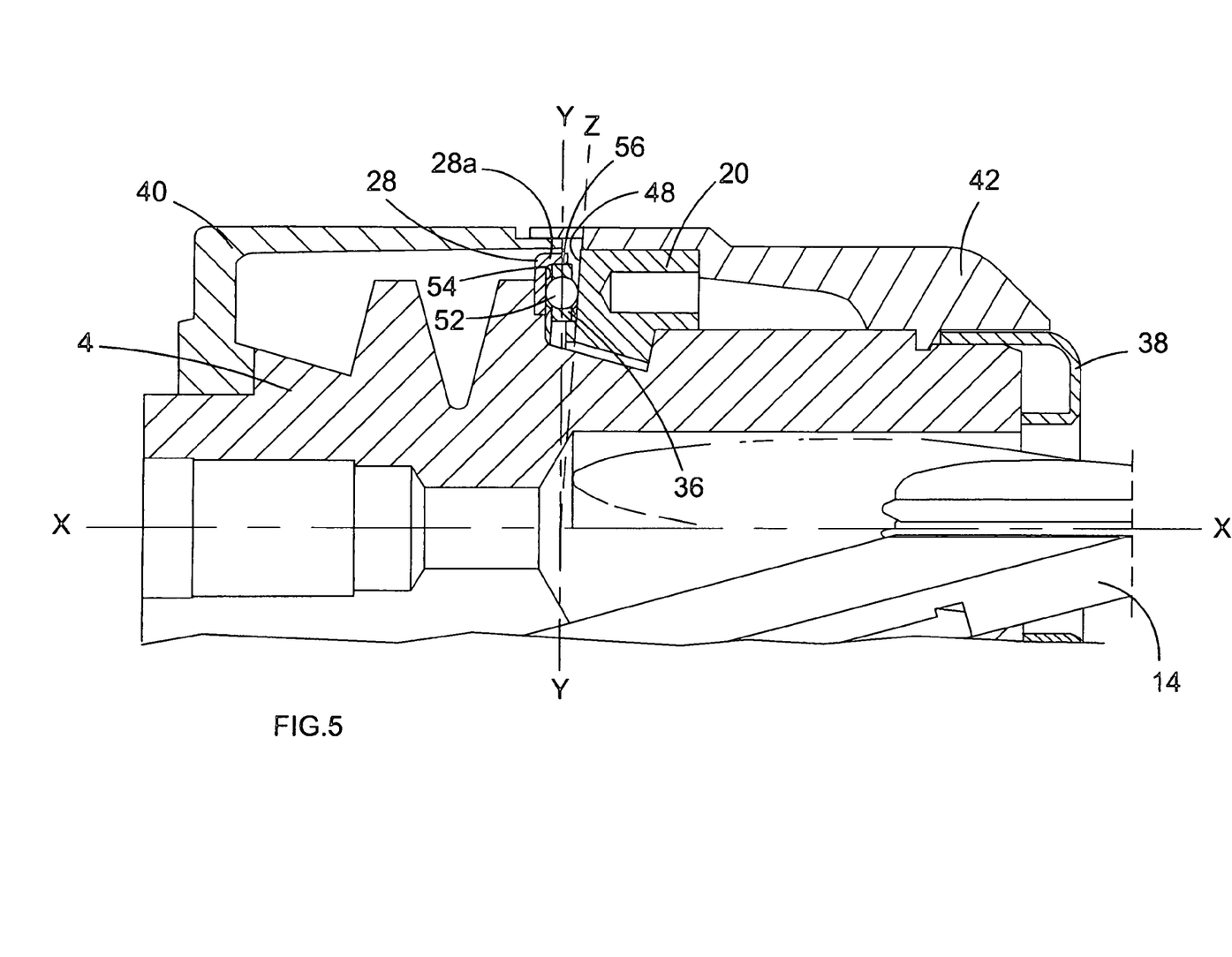

It will be appreciated by those skilled in the art alternatives to the situation shown in FIG. 3 exist. For example (and as shown in FIG. 4) there is no necessity for the running surface 48 of the nut 20 to be angled with respect to the perpendicular Y-Y to the central axis X-X in addition to that of the running surface 54 of the thrust plate 28 also being angled thereto. Thus in FIG. 4 it can be seen that the running surface 54 of the thrust plate 28 is angled with respect to the surface Y-Y along plane X-Y, whilst the running surface 48 of the nut 20 is parallel to the surface Y-Y. Alternatively, as show in FIG. 5 the running surface 54 of the thrust plate 28 is parallel to the surface Y-Y, whilst the running surface 48 of the nut 20 is angled with respect to the surface Y-Y along plane Z-Y.

Those skilled in the art will appreciate that there is no necessity for there to be a thrust plate 28 employed in the chuck 2. By suitable choice of design (apparent to those skilled in the art), the bearing member 36 could simply run against a portion of the body 4. For example, the annular recess portion 22 and associated lower lip 26 could be adapted to be the running surface against which the balls 52 move. Those skilled in the art will appreciate the only necessity is for the bearing member 36, when displaced radially under action of the predetermined force as set out above, to be moved into frictional engagement with a portion of the rear sleeve 40 of chuck 2 which is non-rotatable relative to the central body 4.

Figure 6A:
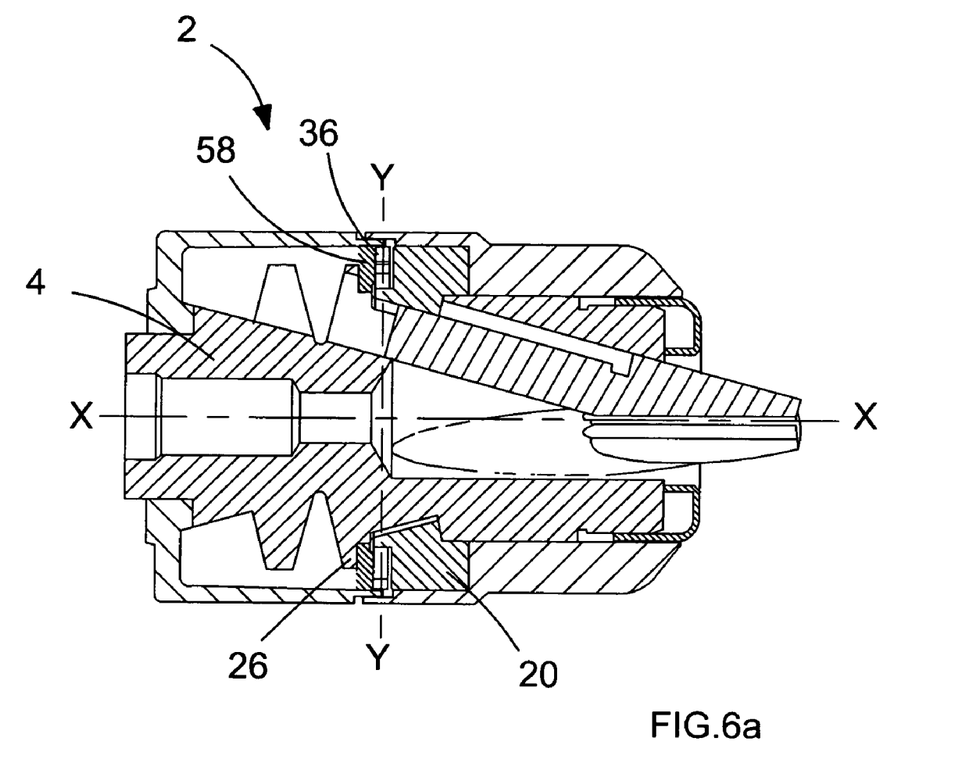
FIGS. 6-9, inclusive, show the same views as those of FIGS. 2(a) and 2(b), but each with a different embodiment of chuck design.
Figure 6B:
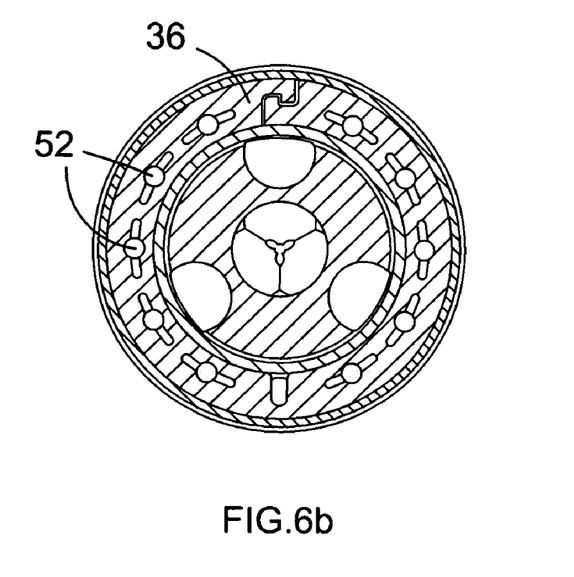

Thus, referring now to FIGS. 6(*a*) and 6(*b*) it can be seen that, compared with the embodiments shown in FIGS. 1 to 5, there is no thrust plate 28. The bearing member 36 is sandwiched between the nut 20 on one side and a hatched portion 58 of the central body 4 on the other side thereof. It is important to note that the hatched portion 58 is shown for clarity only. It is actually simply an extension of the lower lip 26 that is shown for clear visibility in hatching. All other parts of the chuck 2 are as per those element shown in FIGS. 1 to 5.

However, in FIG. 6(*b*) there is shown an alternative form of the bearing member 36. Again, there are a plurality of balls 52 which are able to be radially displaced along the part-conical surface as discussed above, but in the embodiment shown in FIG. 6(*b*) the bearing member 36 is formed of a resilient flexible plastics material such as a polyamide, polycarbonate or thermoplastics which is able to radially expand and contract, effectively, as a unitary structure, under the influence of the forces applied thereto. In all other respects, however, it behaves as per the disclosure in FIGS. 1 to 5. In the example shown in FIG. 6, therefore, the bearing member 36 is in the form of a resiliently deformable ring.

Figure 7A:
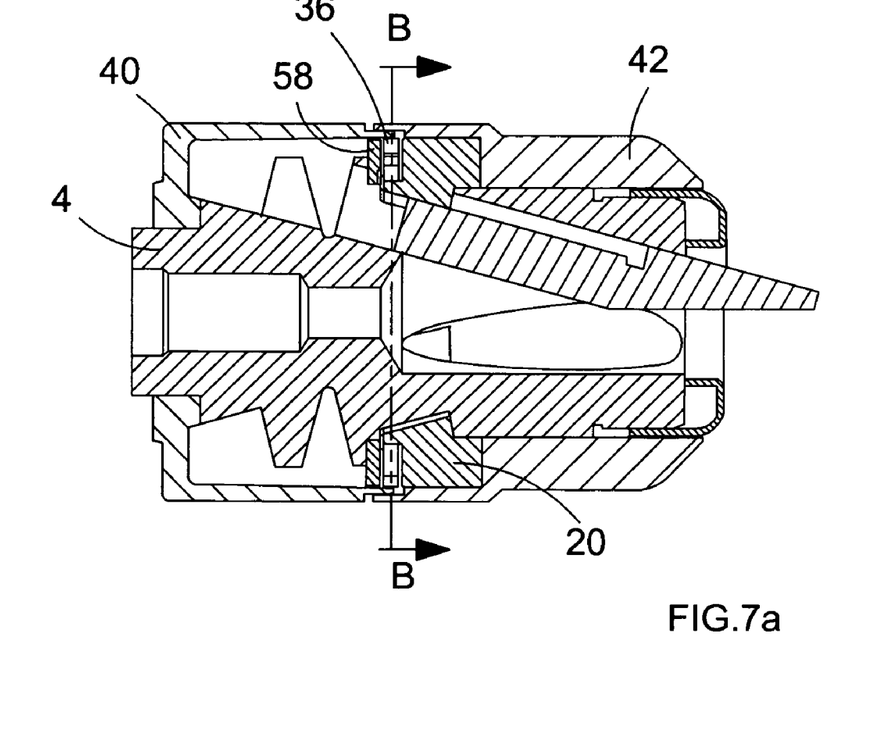
Figure 7B:
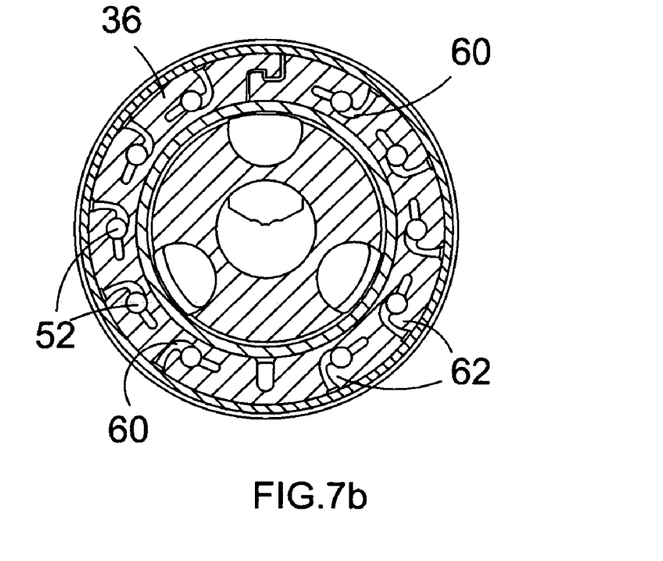

An alternative embodiment is shown in FIG. 7. Again, there is no thrust plate 28 (similar to the example of FIG. 6), but an alternative form of the bearing member 36 is again shown. Referring particularly to FIG. 7(b) it can be seen a plurality of balls 52 are formed within the plastics ring structure of the bearing member 36. However, the specially-shaped cutouts 60 are formed such that as the balls 52 are forced along the part-conical surface in a radial direction under the action of the predetermined force as discussed above, the balls 52 move particular portions 62 of the bearing member 36 rather than the entire bearing member 36 as in the previous examples. The result is still the same, in that the particular portions 62 form the points of contact 56.

Figure 8A:
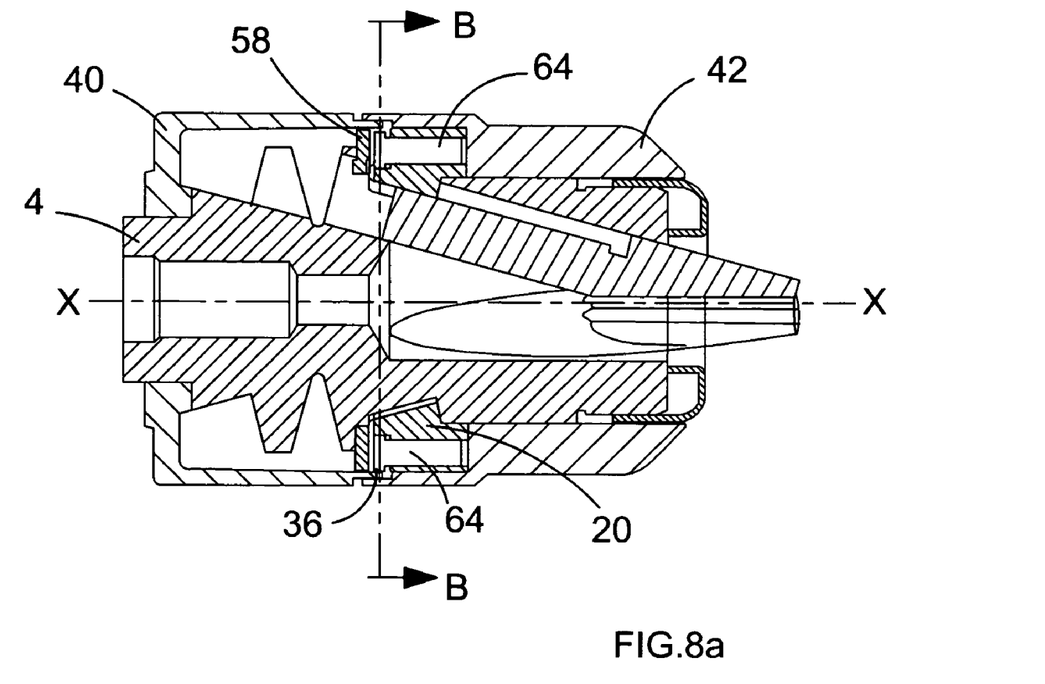
Figure 8B:
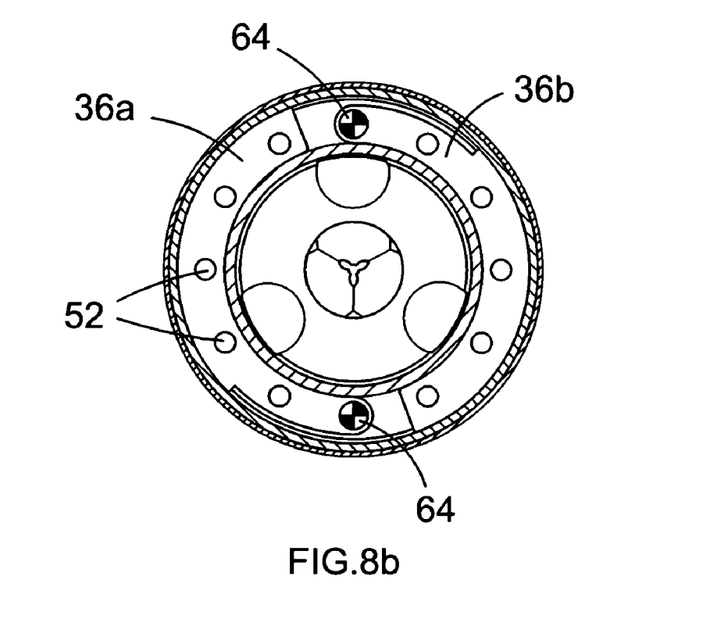

Yet another version of the bearing member 36 is shown in FIG. 8. Again, FIG. 8(a) is of a similar structure to that of FIGS. 6 and 7, in that there is shown a hatched area 58 of the lip 26 rather than a separate thrust plate 28. However, with respect to FIG. 8(b) it can be seen that the bearing member 36, although again including balls 52, in this particular embodiment is coupled to the nut 20 (although, of course, it could be that the bearing member 36 were coupled to the hatched area 58 (or even, if desired, coupled to a thrust plate 28) in the manner discussed below.

Two pivot points 64 are shown forming a fulcrum about which two halves of the bearing assembly 36a and 36b may pivot under the action of the part-conical surface and the predetermined sufficient force as discussed above. Thus, the embodiment shown in FIG. 8(b) functions in a manner similar to an automotive brake shoe by the bearing members 36a, 36b pivoting radially outward into engagement with, in this example, the rear plastics sleeve 42, about their pivot points, or fulcrums, 64.

Figure 9A:
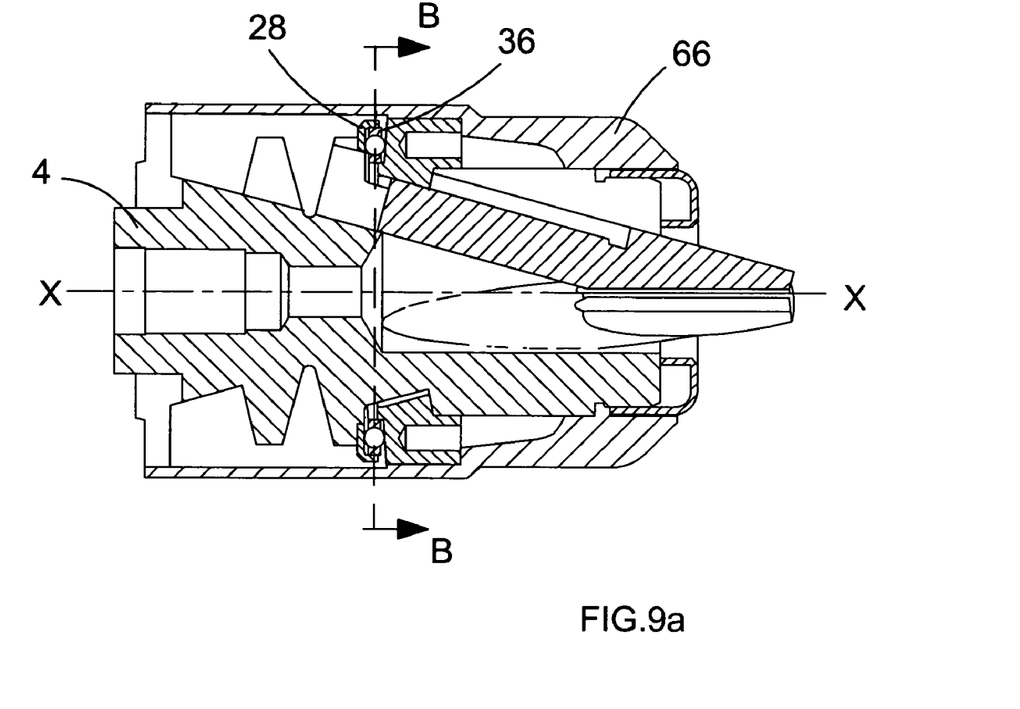
Figure 9B:
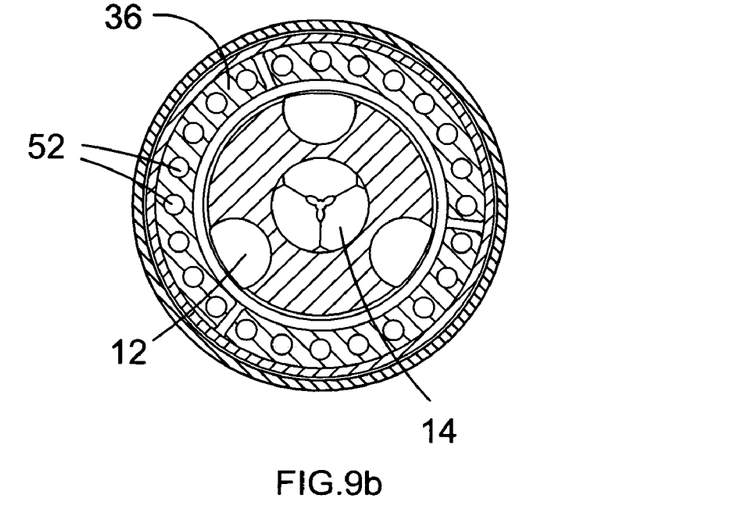

In FIGS. 9(a) and 9(b) there is shown an alternative embodiment of the chuck. In the embodiments shown in FIG. 9 the chuck 2 employs only a single outer sleeve 66 rather than a front sleeve 42 and a rear sleeve 40 as in the other examples. Those skilled in the art will appreciate that the major difference between a two-sleeve and a single sleeve chuck arrangement is that with the single sleeve arrangement some form of spindle lock is needed in order to restrain the spindle upon which the tail section 8 of the chuck 2 is affixed. Nonetheless, the method of operation of the embodiments shown in FIG. 9 is similar to that of the embodiments of FIGS. 1 to 5 in that it is important for the bearing member 36 (taking any of the embodiments shown in the earlier figures) to engage with a portion of the chuck 2 which is non-rotatable relative to the central body 4. Thus, the most convenient solution is that of employing a thrust plate 28. If the bearing member 36 were to be radially displaced along the part-conical surface, as discussed above, and come into frictional engagement with the inner circumferential surface of the single sleeve member 66, then the chuck 2 could not be locked against self-untightening. It is important that the bearing member 36 contact a non-rotational portion of the chuck-hence the preference for a thrust plate 28 which is, itself, non-rotationally fixed to the central body 4.

Figure 10:
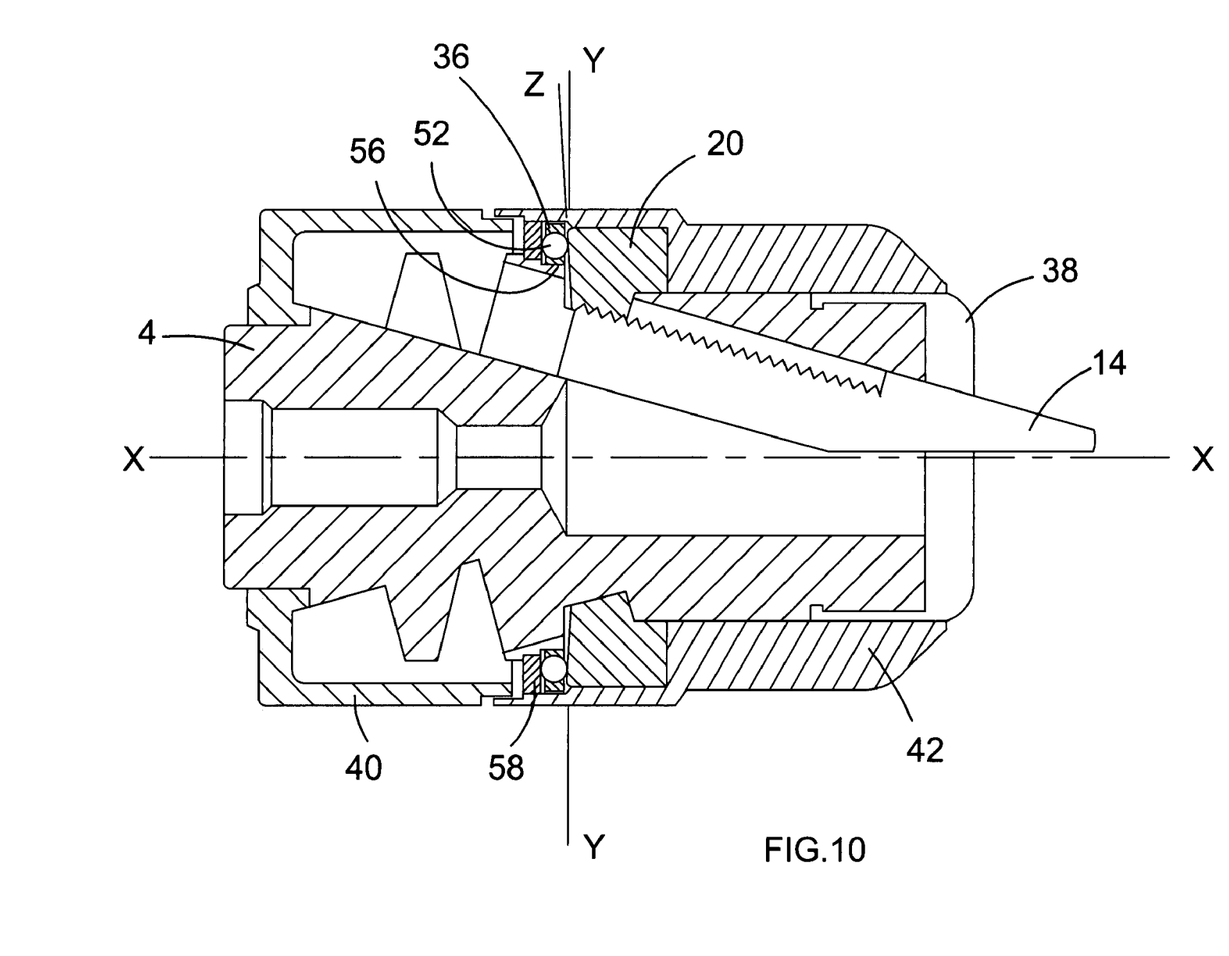
FIG. 10 shows yet a sectional view of a yet further embodiment of the present invention.

Those skilled in the art will appreciate that, whilst in the above examples, the part-conical surface formed between the running surfaces 48 and 54 form a taper increasing in a radially expanding direction relative to the central axis X-X, the part-conical surface and hence taper so-formed could equally expand a radial direction towards the central axis X-X. Such a structure is shown in the embodiment of FIG. 10 which employs the same structure of that shown in FIG. 8, that is without the thrust plate 28. In FIG. 10 it can be seen that the surface Y-Y (which is perpendicular to the central axis X-X) is as in the previous examples. However, it can also be seen that the surface is Z-Y is in the opposite side of the surface Y-Y to that of the earlier examples. All this means, therefore, is that radial displacement of the balls 52 and bearing member 36 is inwardly towards the central axis X-X along the part-conical surfaces so-formed. Nonetheless, the frictional point of contact 56 is now simply radially internal compared with the earlier examples.

Those skilled in the art will appreciate that a part-conical surface describes a solid line of rotation about the running surface 48 of the nut 20, the running surface 54 of the thrust plate 28, or the surface of the lower lip 26 of the central body 4 which contacts the bearing member 36 in order to form a cone or a frusto-conical surface. Nevertheless, there is no need for this to be a smooth tapering so-formed. For example, a series of steps could be employed in order to be right-sided rather than smooth. This would not be preferable, but would still operate in practice. Equally, there is no need for the taper to be of uniform gradient. Suitable curvature shapes such as ellipses, for example, would equally function.

Those skilled in the art will appreciate from the above that the at least one bearing member 36 may comprise a unitary structure, such as the flexible ring, or a plurality of individual flexible or non-flexible members which form a composite bearing member structure.

Although in the above examples bearing balls 52 have been disclosed, any alternative means for reducing the frictional contact between the rotating nut 20 and the other surface upon which the bearing member 36 moves may be achieved. For example, needle bearings or other rolling members, or even a non-rolling member but a member having a very low coefficient of friction can be used. In the event that a low-coefficient of friction member is employed for either the running surface of the nut 20 or the running surface of the thrust plate 28, for example, then the need for ball, or needle or cylinder rolling structure can be obviated. In such a situation, therefore, it can be envisaged that the bearing 36 could simply be a ring structure which itself can be displaced radially in order to achieve frictional engagement at point 56 as discussed above.

Figure 11:
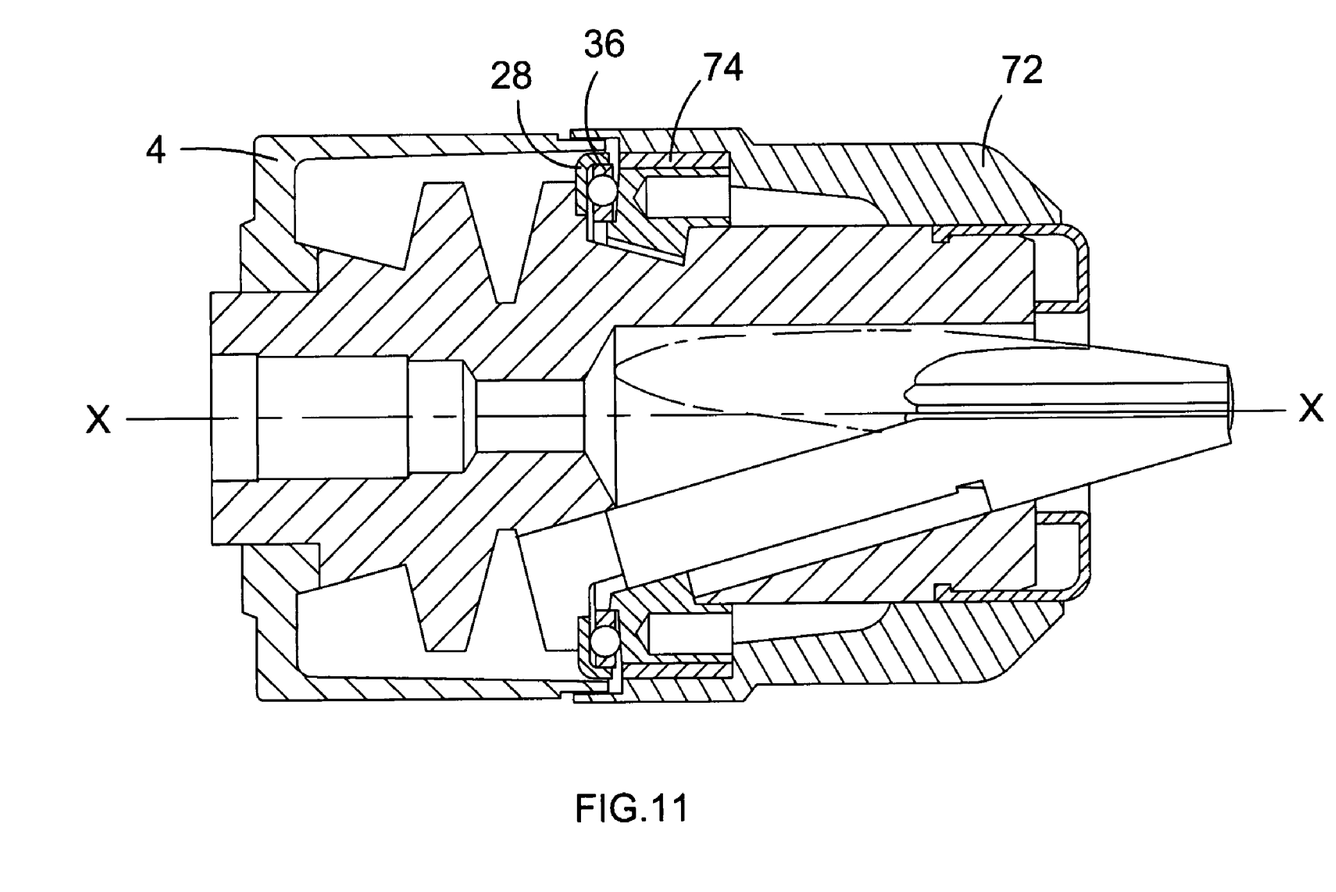
FIG. 11 illustrates a schematically sectional view of a two-sleeve chuck similar to that shown in FIG. 6(a), but with the inclusion of a thrust plate.

Referring now to FIG. 11, there is shown a two-sleeve chuck similar to that of FIG. 6 (a), but with a thrust plate 28 replacing the flat 58 shown in FIG. 6(a). In addition, the front nosepiece 72 is made of plastics material, which, in this embodiment , is insufficiently rigid enough to be able to interact with the rotatable nut. Hence a steel hoop 74 has been inserted between the nut and the inner circumferential periphery of the nosepiece 72 in order to allow proper functioning of the chuck. In all other respects, the chuck shown in FIG. 6 operates in the same manner as that of the chuck shown in FIG. 6.

The invention claimed is:

1. A chuck for use with a manual or a powered driver having a rotatable drive shaft, the chuck for selectively gripping a tool shank, and comprising:

a central body having a tail section and a nose section, the central body defining an axis of rotation;

the tail section having an axial bore formed therein, along the axis of rotation, the tail section for coupling the chuck with a driver presented thereto;

the nose section having a plurality of passageways formed therein, each passageway of the plurality of passageways defining an axis which is angled with respect to the axis of rotation of the central body;

a plurality of jaws, each jaw of the plurality of jaws slidably housed within a respective one of the plurality of passageways, and wherein each of the jaws of the plurality of jaws carries a thread and a jaw face formed on a side of the jaw opposite the thread;

a nut mounted on the central body and being rotatable about the central body, but axially immovable relative to the central body, the nut carrying a screw thread for mating engagement with the threads of each of the jaws of the plurality of jaws, such that rotation of the nut causes concomitant slidable movement of each jaw of the plurality of jaws within its respective passageway, thereby to advance each jaw within its respective passageway when the nut is rotated in one sense about the axis of rotation, and to retract each jaw within its respective passageway when the nut is rotated in the opposite sense of rotation about the axis of rotation;

at least one bearing member disposed intermediate the nut and the central body;

characterized in that between the nut and the central body a part-conical surface is formed, along which part-conical surface the at least one bearing member may travel as the nut is rotated relative to the central body, and along which part-conical surface the at least one bearing member may be displaced radially with respect to the axis of rotation of the central body under action of at least a predetermined amount of force acting upon the at least one bearing member such that the displacement of the bearing member results in frictional engagement between the bearing member and a portion of the chuck which is non-rotatable relative to the central body, thereby to restrain the nut from rotation in the opposite sense under action of less than the predetermined force, wherein the central body includes a thrust plate fixed thereto, against which the at least one bearing member is able to rotate under influence of rotation of the nut, wherein displacement of the bearing member results in frictional engagement with an axially extending circumferential lip of the thrust plate.

2. A chuck according to claim 1 wherein the part-conical surface is formed by a surface of the nut which contacts the at least one bearing member and which surface of the nut is arranged to be not perpendicular to the axis of rotation of the central body.

3. A chuck according to claim 1 wherein the part-conical surface is formed by a surface of the central body which contacts the at least one bearing member and which surface of the central body is arranged to be not perpendicular to the axis of rotation of the central body.

4. A chuck according to claim 1 wherein the surface of thrust plate against which the at least one bearing member rotates is not perpendicular to the axis of rotation of the central body.

5. A chuck according to claim 4 wherein a solid line of rotation about the surface of the thrust plate which contacts the at least one bearing member forms a cone or a frusto-conical surface.

6. A chuck according to claim 1 wherein the at least one bearing member comprises a resiliently deformable ring.

7. A chuck according to claim 1 wherein the at least one bearing member comprises a plurality of moveable or expandable elements.

8. A chuck according to claim 1 wherein the at least one bearing member comprises a plurality of bearing elements pivotable about a pivot point.

9. A chuck according to claim 8 wherein the pivot point is formed at one end of each element of the plurality of bearing elements.

10. A chuck according to claim 1 wherein a solid line of rotation about the surface of the nut which contacts the at least one bearing member forms a cone or a frusto-conical surface.

11. A chuck according to claim 1 wherein a solid line of rotation about the surface of the central body which contacts the at least one bearing member forms a cone or a frusto-conical surface.

12. A chuck according to claim 1 wherein the nut and the central body between them form the part-conical surface.

13. A chuck according to claim 1 wherein the thrust plate and the central body between them form the part-conical surface.

14. A chuck according to claim 1 wherein the bearing member includes a plurality of rolling members to reduce frictional contact between the bearing member and either of the nut or the central body.

15. A chuck according to claim 14 wherein the plurality of rolling members comprise bearing balls.

16. A chuck according to claim 14 wherein the plurality of rolling members comprise cylindrical needle bearings.

17. A chuck according to claim 16 wherein the plurality of rolling members comprise tapered needle bearings.

18. A chuck for use with a manual or a powered driver having a rotatable drive shaft, the chuck for selectively gripping a tool shank, and comprising:

a central body having a tail section and a nose section, the central body defining an axis of rotation;

the tail section having an axial bore formed therein, along the axis of rotation, the tail section for coupling the chuck with a driver presented thereto;

the nose section having a plurality of passageways formed therein, each passageway of the plurality of passageways defining an axis which is angled with respect to the axis of rotation of the central body;

a plurality of jaws, each jaw of the plurality of jaws slidably housed within a respective one of the plurality of passageways, and wherein each of the jaws of the plurality of jaws carries a thread and a jaw face formed on a side of the jaw opposite the thread;

a nut mounted on the central body and being rotatable about the central body, but axially immovable relative to the central body, the nut carrying a screw thread for mating engagement with the threads of each of the jaws of the plurality of jaws, such that rotation of the nut causes concomitant slidable movement of each jaw of the plurality of jaws within its respective passageway, thereby to advance each jaw within its respective passageway when the nut is rotated in one sense about the axis of rotation, and to retract each jaw within its respective passageway when the nut is rotated in the opposite sense of rotation about the axis of rotation;

a bearing assembly member disposed intermediate the nut and the central body, wherein a part-conical surface is formed between the nut and the central body, along which part-conical surface the bearing assembly may travel as the nut is rotated relative to the central body, the bearing assembly having a cage retaining a plurality of rolling elements, wherein the bearing assembly may be displaced radially with respect to the axis of rotation of the central body under action of at least a predetermined amount of force acting upon the bearing assembly such that the displacement of the bearing assembly results in frictional engagement between the cage and a portion of the chuck which is non-rotatable relative to the central body, thereby to restrain the nut from rotation in the opposite sense under action of less than the predetermined force.

19. A chuck according to claim 18 wherein the cage includes a resilient radially outwardly expandable member.

20. A chuck according to claim 18 further including a second bearing assembly having a second cage retaining another plurality of rolling elements, wherein the second cage is radially outwardly moveable into engagement with the portion of the chuck that is non-rotatable relative to the central body.

21. A chuck according to claim 20 wherein the cage and the second cage are arcuately shaped.

22. A chuck according to claim 20 wherein the cage and the second cage are aligned with one another along an arc.

23. A chuck according to claim 18 wherein the cage is formed in three separate sections and each section retains at least one rolling element.

24. A chuck according to claim 23 wherein each section of the cage is arcuately shaped and circumferentially extends approximately 120 degrees.

25. A chuck according to claim 18 wherein the part-conical surface is formed by a surface of the nut which contacts the bearing assembly and which surface of the nut is arranged to be not perpendicular to the axis of rotation of the central body.

26. A chuck according to claim 18 wherein the part-conical surface is formed by a surface of the central body which contacts the bearing assembly and which surface of the central body is arranged to be not perpendicular to the axis of rotation of the central body.

27. A chuck according to claim 18 wherein the central body has formed thereon a thrust plate, against which the plurality of rolling elements is able to rotate under influence of rotation of the nut.

28. A chuck according to claim 27 wherein the cage engages a portion of the thrust plate in the frictional engagement.

* * * * *